Patented Apr. 7, 1936

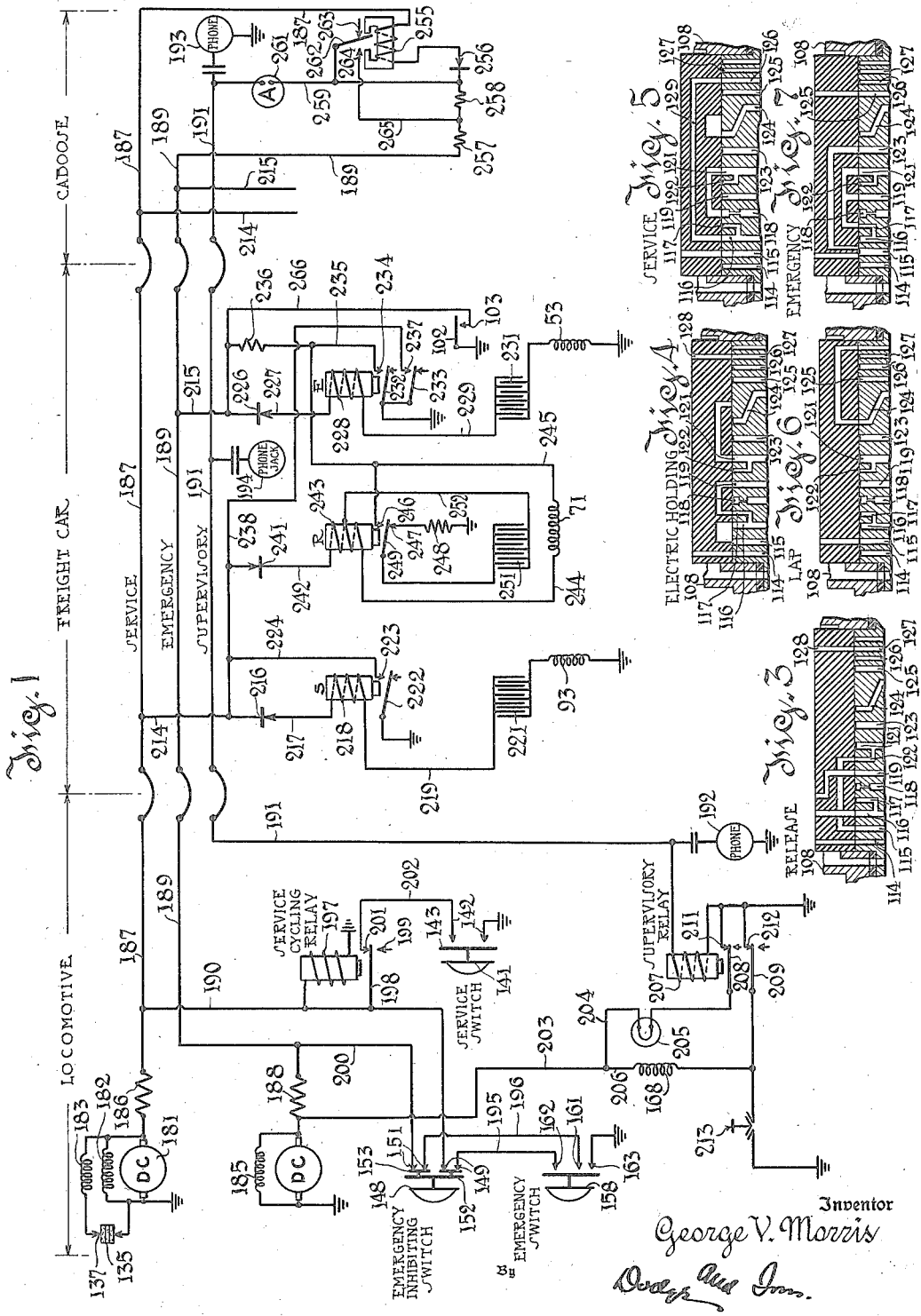

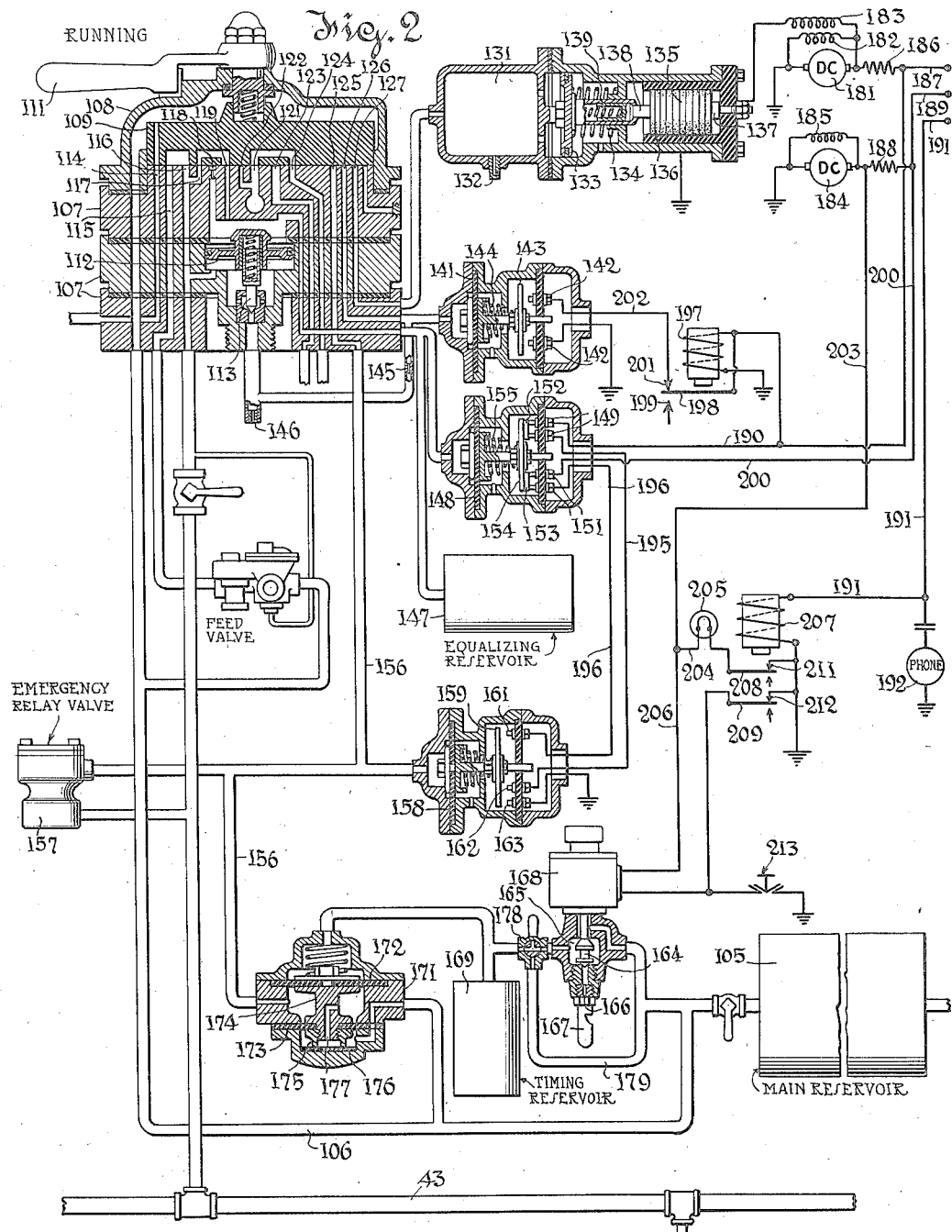

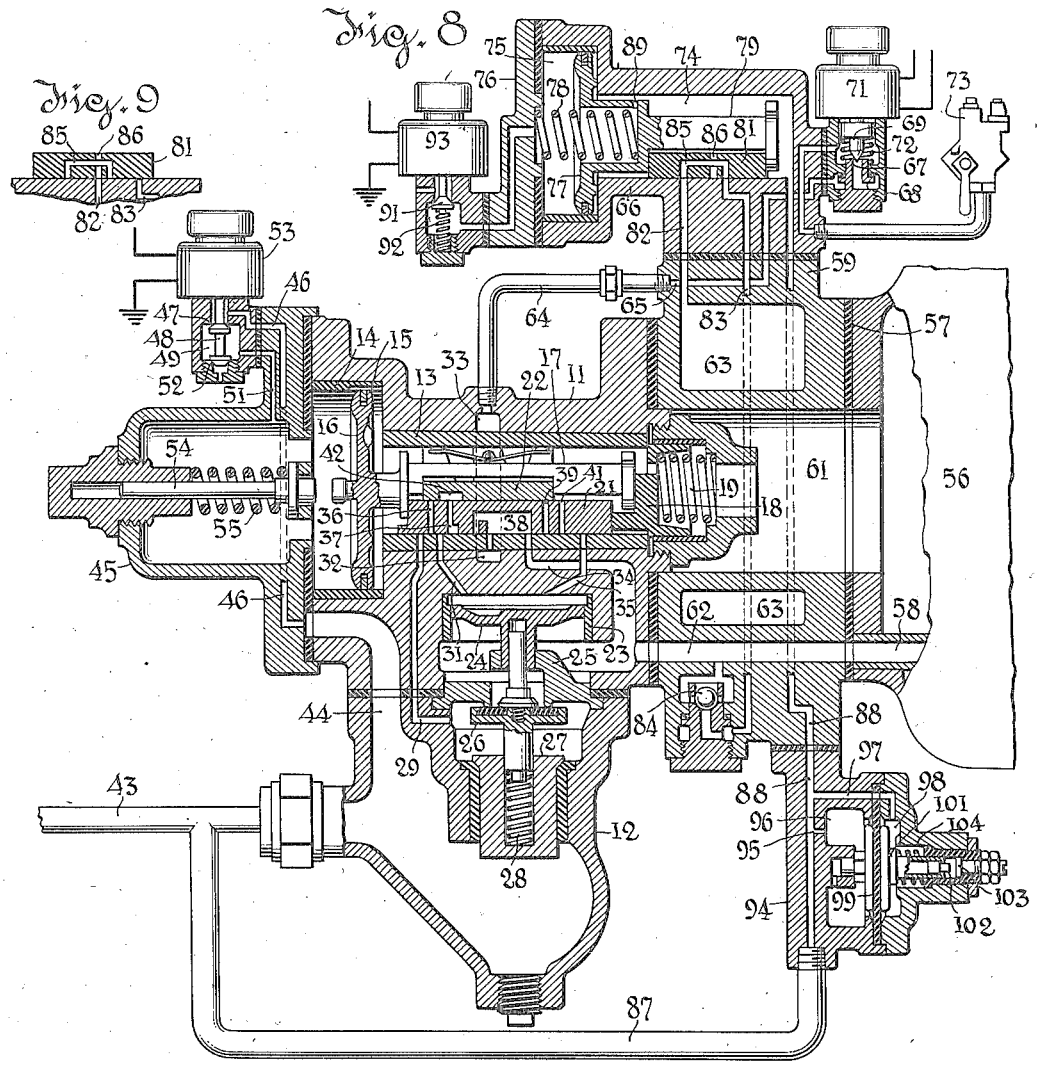

2,036,430

UNITED STATES PATENT OFFICE 2,036,430

BRAKING SYSTEM

George V. Morris, Eugene, Oreg., assignor to The New York Air Brake Company, a corporation of New Jersey Application December 11, 1933, Serial No. 701,913

47 Claims. (Cl. 303—20)

This invention relates to braking systems and particularly to systems involving electrical control features. The electrical control features are of general application, and, since their greatest use will probably be found in connection with systems of the electro-pneumatic type, the invention will be described as embodied in or as supplementing a pneumatic system of known form, but without intention to limit it to this particular system or to systems of the same general type. Such novel pneumatic features as are involved relate chiefly to the translation of brief electrical impulses utilized in this control system, into more sustained pneumatic functions.

The pneumatic side of electro-pneumatic brakes has already been highly developed, and systems, quite diverse in their pneumatic aspects, have been proposed. Some of them are in commercial use. Their chief limitations arise from problems of permissible voltage, line losses and waste of electrical energy, and these limitations are such that use in trains longer than say about twenty cars, is generally considered impracticable. Nearly all such systems involve the use of magnet valves or solenoid valves. Closed circuit (normally energized) operation is essential from the safety standpoint. Parallel connection of the units on the various cars is usually adopted to avoid the resistance variations inherent in series connection on trains of varying length.

The present system, being of the closed circuit, parallel connection type, is available for use in most of the prior art electro-pneumatic systems in lieu of the more conventional electrical circuits used heretofore. In some cases translating means to interpret brief impulses might be necessary, as in the quick service venting mechanism hereinafter illustrated. Furthermore new improved pneumatic systems can be devised to take advantage of the superior characteristics of the electrical circuits here disclosed.

The selection of any particular pneumatic system to illustrate the present invention is thus a matter of wide choice. In the present case the selection has been governed by the following practical considerations. Since the invention exhibits the greatest advantage on long trains, and since the K type freight triple, long standard on American railways, is used on the longest trains, the invention is shown applied to this type of triple valve in conjunction with conventional locomotive controlling equipment, only slightly modified.

Thus a highly practical field of application is opened, but without implying limitation to that field.

Generally considered, the invention involves two main circuits, each with means (condensers) for storing electrical energy on each car. On each car an asymmetric resistance device protects the actuated device (magnet valve) against response during charging of the storing device, and ensures its immediate response to discharge of the storing device. These two main circuits provide for two functions, preferably emergency application (by brake pipe venting) and service by quick service venting. The third function (preferably release) is controlled by disturbing the relative voltage of the two main circuits. These circuits are normally balanced and when thrown out of balance, by raising the voltage of one, cause discharge of a special release condenser. This discharge causes the release magnet to respond. After such response the cross flow between the two main circuits is sufficient to "retain" the release magnet armature in shifted position.

This is a desirable arrangement because the two application circuits are normally closed, while the release magnet winding is normally inert. This is relatively unimportant if the electrical release valve is merely a retainer, but in systems in which it is a true release valve, as is the case in some electro-pneumatic systems, the feature is very important because failure of the circuits cannot cause the release valve to open and defeat an application.

The advantage in using condensers arises from the fact that with proper circuit constants on each car, the effects of line losses can be overcome, so that the condenser on the last car even in a train of say two hundred cars, will charge practically to the voltage at the terminals of the generators on the locomotive. This permits the use of safe voltages, with conductors of reasonable size, and with jumpers of reasonably simple constructions between cars. Furthermore, the total current flowing after the system is charged is small, the leakage current of a well designed commercial condenser being low.

For supervisory purposes a third circuit may be used and if used gives a continuous indication of the condition of the circuits. It may also be used as a telephone circuit.

An embodiment of the invention as applied with H-type engineer's brake valve and K-type triple valves (both standard on American railways) will now be described with reference to the accompanying drawings:

Fig. 1 is a diagram of the circuits for a train comprising a locomotive, one freight car and a caboose. No brake circuits are shown on the caboose, but the leads therefor are shown. The brake equipment would be merely a duplicate of that shown for the freight car.

Fig. 2 is a view showing an engineer's brake valve and related apparatus chiefly in section, and illustrating the connection of this apparatus with the circuits diagramed in Fig. 1. The illustration of the brake valve is conventional to the extent that the ports are illustrated as if they all lay in a single plane. The valve is in running position.

Fig. 3 is a view similar to a portion of Fig. 2 and showing the rotary valve is release position.

Fig. 4 is a similar view showing electric holding position.

Fig. 5 is a similar view showing service position.

Fig. 6 is a similar view showing lap position.

Fig. 7 is a similar view showing emergency position.

Fig. 8 is a vertical axial section of a K-type triple valve in release position and equipped with a modified front cap, and associated with a special filler piece, the front cap carrying the emergency magnet apparatus, and the filler piece the service magnet apparatus and the release (retainer) magnet apparatus.

Fig. 9 is a fragmentary view, similar to a portion of Fig. 8, showing the quick service vent slide valve in venting position.

Referring first to Fig. 8, 11 represents the body and 12 the lower case of a K-type triple valve. The parts in the body and lower case are all standard and need only be identified, as follows:—slide valve bushing 13, cylinder bushing 14 with charging groove 15, triple piston 16 with stem 17, retard stop 18, retard spring 19, slide valve 21 actuated by stem 17 with lost motion, graduating valve 22 positively shifted by stem 17, emergency cylinder bushing 23, emergency piston 24, piston guiding spider 25, emergency check 26, brake pipe check 27 and check valve spring 28. The porting is conventional. In the slide valve seat are brake pipe quick service port 29, brake cylinder quick service port 31, exhaust port 32 (leading to exhaust connection 33), brake cylinder port 34, emergency port 35. In the slide valve are two quick service ports 36, 37, exhaust port 38 with the usual restricted extension effective in retarded release position, service port 39 controlled by the graduating valve 22 and emergency port 41. In the graduating valve 22 is quick service cavity 42 which at times connects ports 36 and 37.

The brake pipe 43 is connected to the lower case 12, as usual, and communicates with a passage 44, which in the usual K valve leads directly to the space to the left of piston 16. In the present case a special front cap 45 is used, having a passage 46 leading to the upper seat 47 of double beat valve 48. The valve 48 is in chamber 49 which communicates by passage 51 with the space to the left of piston 16. The valve 48 also coacts with a lower seat 52 to open and close an atmospheric vent port leading from chamber 49. The double beat valve 48 is shifted between seats 47 and 52 by the energization and deenergization of a winding 53. Normal condition is with winding 53 deenergized and valve 48 closing on seat 52. Excitation of winding 53 occurs in emergency, and shifts valve 48 to isolate from the brake pipe and vent to atmosphere the space to the left of triple piston 16. The duration of the emergency electrical impulse is sufficient to vent this small volume and cause piston 16 to move outward its full traverse and seat on the front cap gasket. This is the well known emergency position in which the slide valve admits auxiliary reservoir pressure to depress piston 24 and open check 26, whereupon brake pipe air flows past check 27 to brake cylinder.

From the above it is apparent that electrical venting in emergency, initiates at each triple valve emergency venting of the brake pipe to the brake cylinder.

Aside from the special ports and the double beat electrically actuated valve above described the front cap 45 conforms to existing standards and has a conventional graduating stem 54 with graduating spring 55.

An ordinary, freight-type, auxiliary reservoir is illustrated at 56 and this has the usual triple valve seat 57 from which leads the brake cylinder pipe 58. Instead of seating the triple valve body 11 on seat 57, a filler piece 59 is interposed. This has a central passage 61 to connect the auxiliary reservoir with the slide valve chamber, a passage 62 connecting brake cylinder port 34 with pipe 58 and a measuring chamber 63 for electrical quick service venting. There are also certain passages, later described.

A pipe 64 connects exhaust passage 33 of the triple valve with a passage 65 in filler piece 59 and body 66 bolted thereto. Port 65 leads to seat 67 in the valve chamber 68. The release valve is shown at 69 and is closed against seat 67 when winding 71 is excited. Spring 72 normally holds the valve 69 open, the winding 71 being normally inert. Air exhausted through seat 67, passes through a manually set retainer 73 of the usual form.

The body 66 contains a slide valve chamber 74 and a cylinder 75 closed by a cap 76. A piston 77 works in cylinder 75 and is urged to the right by spring 78, the piston being guided by a stem 79, which is formed to confine and thus positively actuate a slide valve 81. In the seat for slide valve 81 is a port 82 leading to measuring chamber 63 and a port 83 leading to brake cylinder passage 62. A ball check valve 84 permits flow in port 83 only in a direction toward passage 62.

The slide valve 81 has a loop port 85 which under normal conditions connects ports 82 and 83 so as to vent chamber 63. Remembering that chamber 63 measures the reductions effected by electrical quick service, it will be apparent that in a split reduction application, rising brake cylinder pressure causes an increasing charge to be retained in chamber 63, so that the quantity of air vented decreases on successive reductions. If such decrease on successive reductions is not desired the measuring chamber may be vented to atmosphere instead of being vented to the brake cylinder, this being a familiar practice in the quick service venting art.

The slide valve 81 has a through port 86 which, in the outward (lefthand) position of valve 81, registers with port 82 (see Fig. 9). Valve chamber 74 is connected with brake pipe 43 by pipe 87 and passage 88 so that ports 86 and 82 are quick service vent ports.

The piston 77, normally held to the right by spring 78, is moved to the left by depleting the pneumatic pressure on its outer (left) side. This space is normally charged to equality with the pressure in chamber 74 by a restricted port 89 leading through piston 77. It may be vented at a rate greater than charging flow through port 89 by forcing valve 91 from its seat against the opposition of spring 92 and the unbalanced pressure acting on the valve. The winding 93, when excited, performs this function. It is normally inert, but for service reductions is excited long enough to vent the space to the left of the piston 77 and permit equalization between the pressures in the brake pipe 43 and in chamber 63.

It is desirable that an emergency application initiated pneumatically (for example by a burst brake pipe hose) should be propagated electrically throughout the train, so as to limit slack action. For this purpose a pneumatically actuated switch is associated with the brake pipe at each triple valve. A convenient way is to interpose body 94 between pipe 87 and filler piece 59. Passage 88 extends through body 94, a restricted port 95 leads from passage 88 to chamber 96 and a larger port 97 leads to a smaller chamber 98. A flexible diaphragm 99 separates these chambers. Thus a sudden reduction of brake pipe pressure would cause diaphragm 99 to move to the right quite forcibly while a slow reduction would have little or no effect.

The diaphragm 99 when forced to the right acts through a plunger 101 to shift contactor 102 into engagement with fixed contact 103. A spring 104 resists such motion, and is of such strength as to preserve the desired functional distinction between service and emergency reductions of brake pipe pressure.

Referring now to Fig. 2, it will be observed that control of the electrical circuits is effected by pneumatically operated switches which are controlled by an engineer's brake valve in consonance with the direct pneumatic control exercised through the brake pipe.

A main reservoir 105 of ordinary form and charged in the usual way, supplies air through main reservoir pipe 106 to the engineer's brake valve. The brake valve has the usual sectional body 107, cap 108, rotary valve 109, subject on its top to main reservoir pressure, actuating handle 111, equalizing discharge piston 112 and discharge valve 113 actuated thereby. In the seat for the rotary valve are the customary ports, as follows, governor port 114, feed valve port 115, brake pipe port 116, with branch 117, preliminary exhaust port 118, equalizing reservoir port 119, exhaust port 121 with branch 122, control reservoir port 123, release port 124 and sanding port 125.

The porting of the rotary valve 109, as to the normal seat ports above described is conventional, the following functions being performed in the positions named.

*Running position (Fig. 2).*—Governor port 114 subjected to main reservoir pressure. Brake pipe port 116 connected with feed valve port 115 and equalizing reservoir port 119. Release port 124 connected to exhaust.

*Release position (Fig. 3).*—Governor port 114 subjected to main reservoir pressure. Feed valve port 115 connected to branch exhaust port 122 for warning purposes. Brake pipe port 116 and equalizing reservoir port 119 fed with main reservoir air.

*Electric holding position (Fig. 4).*—Same as running position, except that release port 124 is blanked to hold engine brakes.

*Service position (Fig. 5).*—Feed valve port 115 subject to main reservoir pressure. Preliminary exhaust port 118 connected with exhaust port 121.

*Lap position (Fig. 6).*—Feed valve port 115 subject to main reservoir pressure.

*Emergency position (Fig. 7).*—Main reservoir pressure admitted to control reservoir port 123. Brake pipe branch port 117 and equalizing reservoir port 119 both connected to exhaust port 121. Sanding port 125 fed by main reservoir.

In addition to the normal porting the seat of the rotary valve has two additional ports, an electric service port 126 and an electric release port 127.

The rotary valve 109 is so ported that the following control of ports 126 and 127 is secured.

*Running position (Fig. 2).*—Both ports 126 and 127 blanked.

*Release position (Fig. 3)*—Port 126 blanked. Electric release port 127 subject to main reservoir pressure admitted by port 128.

*Electric holding position (Fig. 4).*—Port 126 blanked. Electric release port 127 subject to main reservoir pressure admitted by port 128. Observe that electric holding position is the same as release as to ports 126 and 127 and the same as running as to ports 115, 116, 117 and 119.

*Service position (Fig. 5).*—Brake pipe port 116 is connected by loop port 129 with electric service port 126, while release port 127 is blanked.

*Lap position (Fig. 6).*—Both ports 126 and 127 blanked.

*Emergency position (Fig. 7).*—Both ports 126 and 127 blanked.

The port 127 leads by way of a connecting pipe to chamber 131 which is constantly vented to atmosphere by way of choke 132. Pressure developed in chamber 131 by the opening of port 127 to main reservoir pressure, acts on a piston 133 against the opposition of spring 134, and tends to compress (and thus reduce the resistance of) a carbon pile rheostat made up of carbon disks 135 held in an insulating guideway 136. The disks contact at one end with a terminal 137. The compressing plunger 138 at the other end is grounded. Between plunger 138 and piston 133 is a yielding telescopic connection 139. Since the travel of piston 133 is limited, the connection 139 protects the rheostat against excessive compressive stress. The choke 132 and chamber 131 ensure slow increase of resistance offered by the rheostat after release, to prevent the occurrence of undesired application functions.

The electric service port 126 leads to the working space of a diaphragm motor which when subject to pressure closes a service switch. The motor diaphragm is shown at 141, the switch contacts at 142 and the bridging contactor at 143. The contactor is forced toward the contacts by the diaphragm and is normally held away from them by spring 144. A branch of port 126 leads through a small choke 145 to the discharge passage from the equalizing discharge valve 113, between valve 113 and an exhaust choke 146. The purpose of this is to hold the switch 143 closed in lap position until valve 113 closes or is about to close.

The effective volume above piston 112 is, as usual, increased by connection with an equalizing reservoir 147. The pressure in the equalizing reservoir when above a chosen low value, say 20 pound's gage, acts to hold a diaphragm-actuated multiple pole emergency inhibiting switch closed and thus establish paths through which the two main operating circuits are grounded by the closing of another switch when it is desired to produce an emergency application.

The diaphragm appears at 148 and two sets of contacts at 149 and 151 respectively. There are two bridging contactors 152 and 153 carried on an insulating disk 154, the disk being urged in a circuit closing direction by the diaphragm and in the opposite direction by a spring 155.

Both the circuits established by the switch just described may be simultaneously connected to ground to product an emergency application, by a diaphragm actuated emergency switch subject to pressure in the sander port 125. Pipe 156 leads from port 125 both to the emergency relay vent valve 157 (as usual) and to the space to the left of diaphragm 158 arranged to close a single bridging contactor 159 against the contacts 161, 162 and 163 simultaneously. Contact 163 is grounded and contacts 162 and 163 are connected respectively each to one of the contacts 149 and 151. Thus, if contact 159 closes while contacts 152 and 153 are closed, both circuits are grounded.

It should be remembered that the conventional relay vent valve includes a vent port through its piston so that pressure in pipe 156 will bleed away in all positions of the engineer's brake valve except emergency position.

Means to produce a brake application, if the electric circuits become deranged, are provided. A double-beat valve 164 in chamber 165 connects that chamber alternately with the main reservoir, or through choke 166 and whistle 167 to atmosphere. When either connection is open the other is closed. The normal condition is with winding 168 energized and the atmospheric vent port closed by valve 164. This charges timing reservoir 169 to main reservoir pressure. The pressure in this chamber acts to close an emergency valve, which when open admits main reservoir air against the diaphragm 158, irrespective of the position of the engineer's brake valve.

The emergency valve just mentioned comprises a body 171 and two flexible diaphragms 172 and 173, of which 172 is materially the larger. The diaphragms are connected to flex in unison by a spacer 174 formed on its lower end with an annular valve rib 175 coacting with seat 176 below the smaller diaphragm. A port 177 leads from the space within rib 175 to the space between the diaphragms. The space above diaphragm 172 is connected to the timing reservoir, the space between the diaphragms with sander pipe 156 and the space below the lower diaphragm with main reservoir pipe 106.

If winding 168 be deenergized the timing reservoir 169 is isolated from the main reservoir and starts to discharge slowly. After a definite time interval valve 175 will open and cause diaphragm switch 158, 159 to close and produce an emergency application. The time interval is to permit the engineer, if he so desires, to reenergize winding 168 by closing a forestalling switch. In doing so he acknowledges the signal that the electric circuits are out of order or ineffective, and that he is dependent on pneumatic brake operation. Deenergization of winding 168 results from derangement of the circuits, as will hereinafter be described.

A threeway cock 178 is provided and when turned 90° counterclockwise from the position shown, opens a bypass 179 to supply main reservoir air to reservoir 169 and at the same time isolates chamber 165 from reservoir 169. This suspends the automatic electric emergency mechanism and is necessary to operation if the electric system is inoperative.

The various electrical circuits will now be described with particular reference to Fig. 1.

On the locomotive are two sources of direct current, of normally equal voltage, one of which is provided with means to increase its voltage relatively to the voltage of the other. These two sources supply two lines extending throughout the train and called the service line and the emergency line.

In the example illustrated, the service generator indicated by numeral 181 applied to its armature has a normal shunt field winding 182 and an auxiliary shunt field winding 183 which last is fully excited only when increased voltage is desired. The carbon pile rheostat 135 (Fig. 2) exclusively controls excitation of winding 183. The emergency generator indicated by numeral 184 applied to its armature has a shunt field winding 185.

The two generators are preferably driven in unison by a single means, such as a turbine and deliver to their lines, current of the same polarity and, when the auxiliary winding 183 is given its minimum excitation, are of substantially equal voltage. Similar terminals of the two generators are grounded as the track offers a good ground return.

Service generator 181 is connected through protective resistance 186 with service line 187 which runs throughout the train, and emergency generator 184 is connected through a similar protective resistance 188 to emergency line 189 which also runs throughout the train.

Paralleling these two lines is a supervisory line 191 which has no connection with either of the other two lines except on the locomotive and the caboose. The primary purpose of this line is to give a continuous indication of the condition of the electrical system, and particularly to indicate whether the electrical service and electrical emergency apparatus is effective. In addition to its supervisory functions the line 191 may form part of a telephone circuit, the permanent connection of instruments being indicated at 192 on the locomotive and at 193 on the caboose. Similar connections might be afforded by the use of jacks 194 on the cars, so that a brakeman might plug in a portable set at any car in the train. Such a telephone circuit would operate independently of the supervisory functions of the line 191 and could involve any suitable refinements of the telephone art.

All the apparatus shown in Fig. 2 is located on the locomotive, and connections can be traced on that figure in such a way as to show the relation between the brake valve and related parts which form normal pneumatic control, and the pneumatically actuated electric switches and similar devices which coordinate the responses of the electrical devices with the normal pneumatic responses of the brake system. The same data is shown in diagrammatic form in Fig. 1.

The service line 187 and the emergency line 189 are both connected to be grounded by the emergency switch and the connection of each to the emergency switch is subject to control by the emergency inhibiting switch which closes when a definite pressure is established in the equalizing reservoir, the switch being actuated in a closing direction by the diaphragm 148. Thus the service line 187 is connected by wire 190 with one of the contacts 149, the other of which is connected by line 195 with contact 162 of the emergency switch. Similarly the emergency line 189 is connected by wire 200 with one of the contacts 151 of the emergency inhibiting switch, the other contact 151 being connected by wire 196 with contact 161 of the emergency switch. The contact 163 of the emergency switch is grounded. Under normal running conditions the contactors 152 and 153 of the emergency inhibiting switch are closed, and it follows that if the contactor 159 of the emergency switch should close, it will ground both the service line 187 and the emergency line 189. The emergency switch is the means by which an emergency application is produced either under the control of the engineer's brake valve or under the control of the supervisory relay, as will be hereinafter explained.

The reason for grounding both the service and the emergency line is to avoid a condition under which the voltage of the service line would be higher than the voltage of the emergency line, this relation being availed of to establish the releasing or the release retaining function.

To produce service applications by causing quick service venting of the brake pipe at each of the triple valves, means must be provided to ground the service line 187 without grounding the emergency line, and in order to produce repeated or cyclic venting of the brake pipe at each triple valve, it is desirable to provide means which will cause such venting to recur as long as the equalizing discharge valve on the engineer's brake valve is open.

This ground connection for the service line can be traced as follows: Branching off from the line 190, which is connected to the service line 187, as above described, is a lead to the winding 197 of the service cycling relay. The other terminal of this winding is grounded as shown. Excitation of the winding 197 (and the winding is normally excited) lifts the armature 198 from the stop 199 and draws it against the front contact 201. The front contact 201 is connected by the wire 202 with one of the contacts 142 of the service switch, the other contact 142 being grounded.

Service switch contactor 143 is moved in a closing direction by the diaphragm 141. As can readily be determined from an inspection of Fig. 5, the diaphragm 141 is subjected to pressure when the rotary valve is moved to service position, and thereafter, in either service or lap position, is kept under pressure so long as the equalizing discharge valve 113 is discharging at a rate exceeding the capacity of choke port 146. From this it follows that the service switch remains closed substantially as long as equalizing discharge flow is occurring at the engineer's brake valve.

When the switch first closes the armature 198 is up. The effect is to establish a ground connection from service line 187 and the voltage in line 187 to the rear of the connection 190 drops, and as will be explained later, the electric service mechanism on all the cars functions to discharge a measured amount of air from the brake pipe. Reduction of the voltage of the line 187 substantially deenergizes winding 197 and armature 198 drops destroying the ground connection.

The voltage in the line 197 does not, however, regain its normal value until the service condensers hereinafter described as carried by the various cars are charged. When they are substantially fully charged, and the voltage of the line 187 approaches its normal value, winding 197 will again pick up armature 198. This reestablishes the ground connection and initiates a new venting cycle which takes place on every car because the condensers just mentioned have been recharged and are then permitted to discharge and actuate the service vent valve.

Since the time necessary to charge all the service condensers 221 is proportional to their total capacity and hence to the length of the train, the cycling will be slower on long trains than on short ones. Hence the development of brake cylinder pressures in service will be slower on long trains which is a desirable characteristic.

The supervisory line 191 leads throughout the train and operates through a supervisory relay to control a signal lamp and the winding 168 of the automatic emergency magnet valve. Current to energize this winding and lamp are supplied by a line 203 which leads from the ungrounded terminal of the emergency generator 184. A branch 204 leads to the lamp 205 and a branch 206 leads to the winding 168. The second terminal of the lamp 205 is connected to the armature 208 and the second terminal of the winding 168 is connected to the armature 209 which are lifted when the winding 207 of the supervisory relay is sufficiently energized. One terminal of the winding 207 is connected directly with the line 191 and the other terminal is grounded. The relay has two front contacts 211 and 212, both grounded and coacting respectively with the armatures 208 and 209. Consequently when the current flow in the supervisory line 191 is normal the winding 207 is fully excited and the armatures 208, 209, are raised against the front contacts, the lamp 205 burns and the winding 168 is excited. Means are provided on the caboose to insure a normal supply of current to the line 191 from both the lines 187 and 189, when all lines are in normal condition and also during the normal functioning of the electric system, but if any line becomes deranged the supply of current to line 191 is reduced, reducing the excitation of winding 207 to a value such that the armatures 208 and 209 will drop to the back contacts, which are merely stops. In such case the winding 168 becomes deenergized, the double-beat valve 154 shifts and the slow bleeding of the timing reservoir 169 commences. The engineer is warned of this condition by sounding of the whistle 167 and the extinguishment of the lamp 205, and may, by closing of a ground switch 213, forestall the action of the emergency switch 159 whose operation has already been described. In this forestalling action the engineer recognizes that the electrical equipment is inoperative and that he is dependent solely on pneumatic operation of the brakes.

Each car, including the caboose, is equipped with electrical apparatus which will now be described, such apparatus controlling energization of the windings 53, 71 and 93, whose functions have been explained with reference to Fig. 8.

On each car the electrical equipment is connected to the service line 187 by a lead 214 and to the emergency line 189 by a lead 215. Since the equipment on all the cars is the same, the illustration in Fig. 1 has been limited to the equipment of one freight car. There would be a similar equipment on the caboose, and this fact is there indicated merely by the illustration of the leads 214 and 215. The caboose alone carries certain portions of the supervisory mechanism, as indicated in Fig. 1.

The equipment on each car comprises three units, first, a service unit which may operate independently of the other two units. Second, an emergency unit which may operate independently of the other two units, but preferably includes a grounding switch for grounding the service line when the emergency mechanism responds in emergency. The third unit is a release unit. The latter is so arranged as to derive its charge under running conditions from the service line and the emergency line equally and to remain inactive while the voltages on these two lines are the same or substantially so. When, however, the voltage of the service line is raised materially above the voltage of the emergency line, the effect is to cause a substantial current flow through the release magnet winding 71 to cause initial response of its armature after which current flow incident to the differential voltage will maintain the armature of the magnet valve in its shifted position.

The service lead 214 is connected to one terminal of an asymmetric resistance device 216, preferably a copper copper-oxide rectifier. A wire 217 leads from the other terminal of the rectifier to one terminal of the winding 218 of the service relay S. The other terminal of this winding is connected by wire 219 to one terminal of an electrostatic condenser 221. The other terminal of this condenser is connected through the winding 93 of the service magnet valve to ground.

The relay S has an armature 222 which when drawn against the front contact 223 connects the line 214 to ground by way of the wire 224. Assume now that the service line 187 is grounded. A discharge circuit for condenser 221 is immediately established from condenser 221 through wire 219, winding 218, wire 217, asymmetric resistance unit 216, wire 214, service line 187, to ground, to winding 93 back to condenser 221. The condenser starts immediately to discharge and the resulting excitation of winding 218 lifts the armature 222 and establishes a local ground on the car, so that the service line 187 is quickly shunted out of the discharge circuit. This insures rapid discharge of the condenser 221 sufficient to insure intense energization of the winding 93, and also grounds the service line 187 locally to hasten the response on adjacent cars.

The emergency circuit is quite similar. Lead 215 is connected to one terminal of the asymmetric resistance device 226, thence by wire 227 to one terminal of the winding 228 of the emergency relay E. The other terminal is connected by wire 229 to one terminal of the electrostatic condenser 231, whose other terminal is connected through the winding 53 of the emergency magnet valve to ground.

The emergency relay E controls two armatures 232 and 233 which are drawn respectively against front contacts 234 and 237 when the winding 228 is energized. The front contact 234 is connected through a resistance 236 with the lead 215, while the front contact 237 is connected through wire 238 with the lead 214.

Assume now that the emergency line 189 alone is grounded or that both the emergency line 189 and the service line 187 are grounded. In either case a discharge path for the condenser 231 will be established as follows: from condenser 231, through wire 229, relay winding 228, wire 227, resistance device 226, lead 215 and emergency line 189 to ground to winding 53 and back to condenser 231. As soon as discharge flow occurs relay E will pick up its armatures 232 and 233. Armature 232 will establish a local ground circuit, insuring rapid discharge of the condenser 231 and local grounding of the emergency line. Armature 233 by closing against contact 237, will ground the service line 187, insuring local grounding of this line.

It will be recalled that the contactor 102 is arranged to close against the contact 103 (see Fig. 8) if brake pipe pressure is reduced at an emergency rate, as it might be, for example, by a burst hose. The effect of the closing of these contacts is to ground the emergency line 189. Ensuing response of the emergency relay E will immediately ground both the emergency and service lines, as just described.

The asymmetric resistance devices 216 and 226 are so contrived that they limit charging flow from the service line and the emergency line respectively to condensers 221 and 231. This limitation not only keeps the maximum current flow in the service and emergency lines within reasonable limits, but it also limits the current flow through the relay windings 218 and 228 and through the service magnet winding 93 and emergency winding 53 to values low enough to insure that the relays and magnets remain inert during charging. On the other hand reverse flow is subject to relatively low resistance so that discharge of the condensers can occur comparatively freely.

The release unit, as stated, is interconnected with the service and emergency units. The lead 214 is connected to the wire 238 and to this wire is connected one terminal of an asymmetric resistance unit 241, so arranged as to offer its less resistance flow away from the service line and its greater resistance to flow toward the service line. The other terminal of this resistance unit is connected by wire 242 with one terminal of a winding 243 of the release relay R. This winding 243 has a tap at its middle. The other terminal of the winding 243 is connected by wire 244 with one terminal of release magnet winding 71. The other terminal of release magnet winding 71 is connected by wire 245 through resistance 236 and lead 215 with the emergency line 189.

The release relay R has a front contact 246 which is connected with the wire 245 and a back contact 247 which is connected through a resistance 248 with ground. The normal condition of the relay is that shown in the drawings in which it is inert and the armature 249 is against the contact 247. Under these conditions there is charging flow from both the service and the emergency lines to the condensers 251. This flow can be traced as follows. From service line 187 through lead 214, asymmetric resistance device 241, upper half of winding 243, wire 252 to condenser 251, the other terminal of the condenser being grounded through armature 249, back contact 247 and resistance 248.

The flow from the emergency line is by way of lead 215, resistance 236, wire 245, winding 71, wire 244, through the lower half of winding 243, and thence through wire 252 to condenser 251 and thence to ground, as before.

The resistance 248 is so proportioned as to limit the charging current to a suitable value. The function of the resistance 236 is to balance the charging currents flowing from the service and the emergency lines. The relay R will be inert because if the two currents are equal they will neutralize each other in passing reversely through the two halves of the winding 243. Thus during charging the relay remains inert.

If, however, the voltage in the line 187 be raised, and this result is produced when desired by compressing the carbon rheostat 135 and rendering the auxiliary field winding 133 effective. The relay R will be thrown out of balance, armature 249 will be drawn against contact 246, and the condenser 251 will discharge, the path of discharge being from one terminal of the condenser, wire 252, through the lower portion of winding 243, wire 244, release magnet winding 71, wire 245, front contact 246 to armature 249, to the other terminal of the condenser. This will excite winding 71 and shift its armature, closing the valve 69 (Fig. 8) and thus closing the exhaust port of the triple valve.

At this time the asymmetric resistance 241 prevents back flow to the service line, which would otherwise occur, because the condenser voltage and emergency line voltage are cumulative.

After the armature of release valve magnet 71 has shifted, it is held in its shifted position by current flow as a result of the sustained difference in voltage between the service and the emergency lines. This flow occurs by way of lead 214, through resistance device 241, winding 243, wire 244, winding 71, wire 245, resistance 236 and lead 215 to the emergency line 189.

The supervisory equipment on the caboose involves means for connecting both the emergency line and the service line to the supervisory line, in such a way that if any one of the three lines becomes deranged, the supervisory relay 207 on the locomotive will be partially or wholly deenergized. To effect the desired result the service line 187 is connected to the winding 255 of a polarized relay, the other terminal of whose winding is connected through an asymmetric resistance device 256 favoring flow away from the service line. The other terminal of the asymmetric resistance device 256 is connected by wire 259 and a milliammeter 261 with the supervisory line 191. The emergency line 189 is connected through two approximately equal resistances 257 and 258, connected in series, to the line 259. The sum of the resistances 257 and 258 approximately equals the sum of the resistance of winding 255, and the resistance of 256 to flow toward line 259. Consequently, the lines 187 and 189 normally furnish substantially equal currents at the same voltage to the line 259.

When current is flowing from line 187 to line 259, and also when no current is flowing through winding 255, the armature 262 of the polarized relay remains against inert stop 263, but if flow in the winding 255 reverses the armature 266 shifts against contact 264. Since the armature 262 is connected to the wire 259, and since the contact 264 is connected by wire 265 between the resistances 257 and 258, the effect is to shunt out the resistance 258. It follows that if the service line 187 is grounded, as it is to produce a service application, the relay armature 262 will shift and reduce the resistance between the emergency line 189 and the supervisory line. At this time the emergency line alone furnishes current to the supervisory line and the shifting of the armature by reducing the total resistance of the circuit, permits maintenance of an adequate current flow through the supervisory relay 207 on the locomotive and prevents this relay from producing an emergency application.

When the armature 262 shifts, the armatures 208 and 209 of the supervisory relay will drop momentarily and the blinking of the light 265 will indicate to the engineer that the polarized relay on the caboose is operating normally.

The above gives a general outline of the circuits. The relation of the capacity of each condenser to the inductance of the associated relay winding, and magnet valve winding, will control circuit characteristics and these values can be so chosen, according to known principles, that the maximum current flowing, the time required to complete charging, and the discharge circuit characteristics are such as to meet the service requirements. When the system is charged, the service and emergency line voltages at the rear end of the train will approach the voltages available at the terminals of the two generators. Consequently, the use of large conductors for the service, emergency and supervisory lines is unnecessary. For similar reasons no unusually rigorous requirements are placed upon the efficiency of the jumper contacts between cars.

When the system is fully charged the current flow in the circuits is merely the aggregate of the leakage currents of the condensers, and since such leakage is small in well designed condensers, the waste of electrical energy in the system is remarkably small.

The functions of the various pieces of apparatus have been explained in connection with the description of the apparatus, and only a very brief general description of operation is considered necessary.

The strictly pneumatic functions of the brake conform to those now standard. As it can reasonably be assumed that any one skilled in the art is familiar with these functions they will be given only the briefest mention.

OPERATION

*Running position (see particularly Fig. 2)*

In this position the brake pipe and the equalizing reservoir are fed by the feed valve. The locomotive brakes are released through the release port. In this position the sander port 125, electric service port 126 and the electric release port 127 are all blanked so that the emergency switch 159 is open, the service switch 143 is open and the carbon pile rheostat 135 is free of pressure. Under these conditions the voltages in the service line 187 and emergency line 189 are equal. The various condensers will charge as described and the apparatus on the caboose will assume the position as shown in Fig. 1. It should be observed that in this position the equalizing reservoir 149 is charged so that the emergency inhibiting switch will be closed and the system will be conditioned for electric emergency actuation.

*Service position (see Fig. 5)*

In this position the equalizing reservoir is slowly vented, as usual, and the port 129 admits brake pipe air to the electric service port 126, closing the electric service switch 143. The engineer's brake valve is allowed to remain in service position only long enough to establish the desired reduced pressure in the equalizing reservoir 149. It is then moved to lap position. In lap position the port 129 ceases to connect the brake pipe port with the electric service port, but so long as the equalizing discharge valve 113 delivers air to the exhaust fitting 146 at a substantial rate, the service switch 143 will remain closed. The closing of this switch establishes a ground connection from the service line 187 through the line 190 (see Fig. 1) and the service cycling relay 197 performs its cycling function already described. This alternately discharges the condenser 221 through the service magnet winding 93, then recharges the condenser, and again discharges it through the winding 93, such cycles recurring as long as the service switch remains closed, that is, as long as the equalizing discharge valve is actively discharging air from the brake pipe. Each time the magnet valve winding 93 is excited, the piston 77 moves to the left and discharges air from the brake pipe into the measuring chamber 63. As soon as the winding is deenergized the pressures on the piston 77 equalize so that the piston moves back and pressure is equalized between the chamber 63 and the brake cylinder. Consequently the cycling action of the relay 197 causes recurrent quick service venting of the brake pipe, the amount of air vented diminishing with each successive venting. When the equalizing discharge valve closes, the service switch opens and the cycling relay closes. Should the pressure in the equalizing reservoir be further reduced, the service switch will again close and the cycling relay will resume its operation and continue in operation until the equalizing discharge valve closes or substantially closes.

*Emergency position (Fig. 7)*

If the engineer's brake valve be moved to emergency position the pneumatic functions characteristic of the ordinary pneumatic operation take place. One of these is the admission of main reservoir air directly to the sanding port 125. This causes the operation of the emergency relay valve and also causes the contactor 159 of the emergency switch to close against the contacts 161, 162 and 163, the emergency inhibiting switch being closed by equalizing reservoir pressure on the diaphragm 148. The effect of the closure of the switch 159 is to ground both the service line 187 and the emergency line 189. This produces energization of the emergency magnet valve winding 53 and results in isolation of the space to the left of the triple piston 16 and the sudden venting of that space to atmosphere. Consequently the triple valve makes its full travel to emergency position, the emergency piston 24 is forced down and brake pipe air is admitted to the brake cylinder to augment brake cylinder pressure in the usual manner.

The grounding of both the service and the emergency lines deenergizes the supervisory line 191 and consequently deenergizes winding 168 of the supervisory magnet valve. This vents the timing chamber 169 so that after the normal time interval the emergency valve 174 will shift and admit main reservoir air directly to the sanding pipe 156.

*Release after emergency*

The emergency function is accompanied by the venting of all the air from the equalizing reservoir 149 and when equalizing reservoir pressure reaches a low value, say twenty pounds, the emergency inhibiting switch 154 will open. This interrupts the connections through which the emergency and service lines are grounded in emergency application. The effect is to permit reestablishment of the normal voltage in the service and emergency lines which will be followed by the recharge of the condensers throughout the train. The reestablishment of this voltage will cause the supervisory relay 207 to lift its armatures 208 and 209, thus causing the excitation of the winding 168 of the supervisory magnet valve. This terminates the venting of the timing reservoir 169 and recharges that reservoir, closing the emergency valve 174. Consequently, as soon as the rotary valve 109 is moved from emergency position, the pressure in the sanding pipe 156 will bleed away through the vent port in the emergency relay valve 157. The emergency switch 159 will then open. When this condition has been established, and this is indicated by the relighting of the lamp 205, the engineer may move his brake valve to a releasing position, such as full release, running or electric holding position, and recharge the system pneumatically.

*Release position (Fig. 3)*

In this position main reservoir air is admitted through the port 128 to the electric release port 127. This compresses the carbon pile rheostat, raises the voltage in the service line 187, and, in the manner already described, excites the windings of the release magnet valves and closes the valve 69 against exhaust of brake cylinder pressure. In this way the auxiliary reservoirs may be recharged without releasing the brakes.

*Electric holding position*

To prevent overcharging of the brake pipe, the engineer shifts his brake valve to the electric holding position (Fig. 4), after a definite period in full release position. In this position the brake pipe is fed with air from the feed valve instead of being fed with air at main reservoir pressure, and in all other respects the pneumatic functions are similar to those characteristic of the well known holding position. In electric holding position the port 128 still registers with the electric release port 127 so that the valves 69 throughout the train are held closed and brake cylinder pressure is retained.

*Running position*

If the engineer now desires to release or reduce brake cylinder pressure, he may shift the brake valve handle to running position (Fig. 2). In this position the electric release port 127 is blanked and the pressure in chamber 131 leaks away slowly. Slow release of this pressure is important because rapid reduction of the voltage on the service line 187 will cause response of the service relay S and initiation of an undesired service application. Since the releasing flow from the triple valves is slow, it is possible for the engineer to reclose the valves 69 throughout the train by shifting the engineer's brake valve back to electric holding position. In this way there is limited provision for graduated release of the brakes.

If the engineer desires to avoid retention of brake cylinder pressure, he may shift his brake valve directly to running position, avoiding release and electric holding positions. If this practice be followed the release magnet valve winding 71 will not be energized.

*Automatic emergency initiated by supervisory circuit*

It has already been explained that during the normal functioning of the electric mechanism current is supplied continuously to the supervisory line, keeping the winding 207 of the supervisory relay fully energized.

If the energization of winding 207 is reduced below a definite critical value, the fact will be signalled to the engineer, first by the extinguishment of the light 205, and second, by the blowing of the whistle 167, and he is thus warned that an automatic emergency application will follow after a time interval fixed by the volume of reservoir 169 and the size of port 166, unless he acts to forestall it.

The energization of winding 207 will be reduced below the critical value above mentioned if either operating line 187 or 189 be broken, and if the supervisory line be broken winding 207 will be completely deenergized. If service line 187 be broken and not grounded current flow through winding 255 ceases but does not reverse. Hence line 189 alone furnishes current to supervisory line 192 through both resistances 257 and 258 in series. This reduces the current flowing sufficiently to cause relay 207 to drop armatures 211 and 212. If line 189 be broken, line 187 alone will furnish current to line 191 through winding 255 and resistance device 256. The reduction in current flow in line 191 causes relay 207 to drop its armatures.

If the engineer immediately closes the forestalling switch 213, he will reenergize the winding 168 and prevent the occurrence of an emergency application, but he is advised by the necessity of closing this switch that the electric system is out of order and that he must rely on strictly pneumatic operation. If he does not close the switch 213 the venting of timing reservoir 169 will cause response of the emergency valve 174. This will admit main reservoir air to actuate emergency relay valve 157 and emergency switch 159. Consequently emergency application will be initiated both pneumatically and electrically regardless of the position of the engineer's brake valve.

In its broadest aspects the invention involves the idea of providing some means on each car for storing electrical energy, trickle charging this storage means from electrical train lines at rates which will keep the current flowing in the train line to a reasonably low value, and which will preclude the response to such charging flow of relays or magnet valves intended to control the brake functions on the car. The scheme also contemplates the association with the storage means of some device, such as a relay which is sensitive to conditions in the charging circuit and which may, through manipulation of the charging circuit, be actuated to bring about discharge of the storage device through the electric mechanism arranged to control the brakes. This scheme may be embodied with various specifically different storage devices, so that while a condenser is preferred, the invention is not strictly limited to the use of a condenser. Similarly, while an asymmetric resistance device of the copper copper-oxide type is preferred to secure trickle charging of the storage device without impairing the ability of that device to offer a rapid discharge, other asymmetric resistance devices or valves are known, and their possible substitution is within the broad scope of the invention.

The embodiment of the invention with the K triple valve is necessarily subject to some of the limitations inherent in that triple valve, but the description is intended to be illustrative and not limiting. The invention resides primarily in the electric system and not in its specific application to any particular pneumatic system. Circuits of the type described might be used to control three functions of any type of brake valve, or a greater number of such circuits might be used, if it be considered desirable to control electrically a greater number of functions than the three here described. Moreover, while I prefer to make use of pneumatically actuated switches subject to primary control of an engineer's brake valve, other schemes for controlling the electric circuits associated with such valves have heretofore been proposed, and might be adopted in particular cases without departing from the broader aspects of the present invention.

What is claimed is:—

1. A fluid pressure braking system comprising an electric energy storage device; means for trickle-charging said device; an electrically operated fluid pressure brake incapable of responding to said trickle-charging current but responsive to discharge of current from said energy storage device; and means for causing discharge of said device to actuate said brake.

2. A braking system comprising electrically operable brake controlling means, a source of current; an electric energy storage device; means for charging said device from said source; and means for establishing a low resistance path across the terminals of the energy storage device to cause discharge thereof to operate said brake controlling means.

3. A fluid pressure braking system comprising a fluid pressure brake; electrical operating means for said brake; an electrostatic condenser; means for charging said condenser; and means for causing discharge of said condenser through said electrical operating means to operate said brake.

4. A braking system comprising a brake; electrical controlling means for said brake; an electrostatic condenser; a source of electric current for charging said condenser; an asymmetric resistance interposed between said source and said condenser to limit the charging current supplied to said condenser to a value insufficient to actuate said electrical brake controlling means, but to permit substantially free flow of discharge current from said condenser; and means for causing discharge of said condenser through said electrical operating means.

5. A braking system of the closed circuit type comprising a fluid pressure brake having release, service, and emergency functions; electrically operated means associated with each of said functions; a plurality of electrostatic condensers, each arranged to supply operating current to a corresponding one of said means; a source of current for charging said condensers; and means for selectively discharging said condensers through said electrically operated means to cause said brake to carry out one or more of its functions.

6. A braking system comprising a fluid pressure brake; means including an electrically controlled valve for causing operation of said brake; a source of electric current; an electrostatic condenser; means for charging said condenser from said current source; a relay device for causing operation of said valve by current discharged from said condenser; and means for causing discharge of said condenser to pick up said relay device and operate said valve to operate said brake.

7. A braking system comprising a fluid pressure brake; electrically controlled valves for causing service and emergency brake applications selectively; service and emergency lines; separate means for supplying current to each of said lines; an electric energy storage device connected to each of said lines; an asymmetric resistance element interposed between each of said devices and the associated line to cause said devices to be trickle-charged from the lines; a relay device in circuit with each of said energy storage devices, said relay devices being non-responsive to the trickle-charge current but responsive to discharge current from said electric energy storage devices; and means for establishing a low resistance ground on either the service or emergency line to cause operation of the associated relay device and to initiate a brake application.

8. A braking system comprising a service line and an emergency line; means for supplying electric current to said lines; a plurality of electrostatic condensers arranged to be charged from said lines; a service relay interposed between one of said condensers and the service line; an emergency relay interposed between another of the condensers and the emergency line; a release relay interposed between a third condenser and the two lines, said release relay being arranged to remain balanced so long as balanced currents flow to it from said lines; fluid pressure braking means under control of said relays; and means for establishing a low resistance circuit for each of said condensers selectively to cause operation of said braking means or to release the same.

9. A braking system comprising a source of electric current; fluid pressure braking means; an electrostatic condenser; means for charging said condenser from said course; means responsive to discharge current from said condenser for causing operation of said braking means; a service switch for establishing a low resistance ground connection to said condenser to cause a brake application; a relay device controlling said connection; and means rendered active by the closing of said service switch to cause the relay to open and close said connection periodically.

10. In a braking system a fluid pressure brake; a source of current; an electrostatic condenser; means for charging said condenser from said source; electrical means responsive to discharge current from said condenser for causing operation of said brake; means for establishing a low resistance connection across the terminals of said condenser to discharge the same; and means including a supervisory circuit for giving a continuous indication of the condition of the charging means.

11. A braking system comprising a fluid pressure brake and manually operable means for controlling it; electrically operable means supplemental to said manually operable means for controlling the operation of said brake; a source of current; an electric energy storage device; means for trickle-charging said device from said source; and means for establishing a low resistance ground across the terminals of said electric energy storage device to discharge the same through said electrically operable means to cause a brake application.

12. A braking system comprising a fluid pressure brake and manually operable means for controlling it; electrically operable means supplemental to said manually operable means for controlling the operation of said brake; a source of current; an electric energy storage device; means for trickle-charging said device from said source; electromotive means for causing operation of the brake; means for establishing a low resistance ground across the terminals of said storage device to discharge the same through said electromotive means; and means for giving an indication of the condition of the electrically operable means.

13. A braking system comprising a fluid pressure brake including manually operable means for controlling the same; electrical means supplemental to said manually operable means for controlling brake applications; a plurality of electrostatic condensers; two sources of current for charging said condensers; means for causing discharge of said condensers selectively through said electrical means to control brake applications; and electrical means normally energized from both said sources but responsive to voltage difference between them for controlling said fluid pressure brake to retain the brakes applied.

14. A braking system comprising a fluid pressure brake; electrically responsive means for causing operation of said brake; a plurality of electrostic condensers; a plurality of sources of current for charging said condensers; means for causing discharge of said condensers through said electrically responsive means to cause brake applications; and electrical means normally energized from both said sources and responsive to voltage difference between them for causing a retaining operation of said electrically responsive brake-applying means.

15. A braking system comprising a fluid pressure brake; electrically responsive means for operating said brake; a service line; means for supplying current to said service line; an emergency line; means for supplying current to said emergency line; an electric energy storage device connected to said service line and arranged to be charged therefrom; an electric energy storage device connected to said emergency line and arranged to be charged therefrom; means for causing discharge of said electric energy storage devices selectively through said electrically responsive means to cause service or emergency brake applications; a third electric energy storage device; means whereby said third device may be charged from the service line; means for boosting the voltage of the service line; and means energized from both said lines and responsive to voltage difference between them to cause discharge of said third device to produce a retaining operation of said electrically responsive brake applying means.

16. A braking system comprising a fluid pressure brake; electrically responsive means for actuating said brake and including electromotive means capable of performing a retaining action when energized; a service circuit and an emergency circuit; means for supplying electric current to each of said circuits, said currents being normally of approximately equal voltages; means for increasing the voltage impressed on one of said circuits; energy storing means arranged to be charged from both said circuits when their voltages are approximately equal; and means responsive to increase of voltage in one of said circuits to discharge said storing device through said electromotive device to initiate its retaining action.

17. The combination of a pneumatic brake system comprising a brake pipe extending throughout a train of vehicles, and reservoirs, brake cylinders and automatic brake valves connected therewith on the various vehicles; three electromotive devices associated with each such automatic valve, and each arranged to control a corresponding function thereof; two electrical circuits extending through the train; controllable means for supplying electric energy to each of said circuits; three means on each vehicle for storing electric energy, two of said means being connected to be charged individually from respective train circuits and the third jointly by both train circuits; two relay devices responsive to deenergization of the two circuits respectively and connected to discharge respective energy storing means individually charged from said circuits through corresponding electromotive devices; a third relay device responsive to an abnormal voltage relation between the two circuits to discharge the third energy storing means through the third electromotive device; and means comprising asymmetric resistance devices for protecting said relay devices against response to charging flow.

18. The combination defined in claim 17, in which one of the two relays first-named functions when it operates also to deenergize the train circuit associated with the other of said two relays.

19. The combination defined in claim 17 in which the abnormal voltage relation between the two train circuits becomes effective to maintain the associated electromotive device active when such device has been rendered active by discharge from the energy storing device.

20. The combination defined in claim 17 in which the asymmetric resistance devices are rectifiers of the copper copper-oxide type.

21. The combination of a pneumatic brake system comprising a brake pipe extending throughout a train of vehicles, and reservoirs, brake cylinders and automatic brake valves connected therewith on the various vehicles; three electromotive devices associated with each such automatic valve, and each arranged to control a corresponding function thereof; two electrical circuits extending through the train; controllable means for supplying electric energy to each of said circuits; three means on each vehicle for storing electric energy, two of said means being connected to be charged individually from respective train circuits and the third jointly by both train circuits; two relay devices responsive to deenergization of the two circuits respectively and connected to discharge respective energy storing means individually charged from said circuits through corresponding electromotive devices; a third relay device responsive to an abnormal voltage relation between the two circuits to discharge the third energy storing means through the third electromotive device; and means for protecting said relay devices against response to charging flow comprising asymmetric resistance devices for the individually charged energy storing means, and a split winding in that relay device associated with the third energy storing means, such winding being so connected that the two currents which jointly charge the third energy storing device neutralize each other and maintain the relay inert.

22. The combination defined in claim 21, in which the abnormal voltage relation between the two train circuits becomes effective to maintain the associated electromotive device active when such device has been rendered active by discharge of the energy storing device.

23. The combination of a pneumatic brake system, comprising a brake pipe extending through a train of vehicles, and reservoirs, brake cylinders and automatic brake valves connected therewith on the various vehicles; three normally deenergized electromotive devices associated with each such valve and each arranged to control a corresponding function thereof; two electrical circuits extending throughout the train; controlling means for maintaining said circuits normally energized and deenergizing one or both at will, and for establishing an abnormal voltage relation between the circuits while maintaining both energized; three means on each vehicle for storing electric energy, two of said means being connected to be charged individually from respective train circuits, and the third jointly from both train circuits; two relay devices, each responsive to deenergization of respective train circuits and connected to discharge respective ones of the two energy storing means charged from individual circuits, through corresponding ones of said electromotive devices; a third relay device responsive to said abnormal voltage relation to discharge the third energy storing means through the third electromotive device; and means comprising asymmetric resistance devices for protecting said relay devices against response to charging currents.

24. The combination defined in claim 23 in which the asymmetric resistance devices are rectifiers of the copper copper-oxide type.

25. The combination defined in claim 23 in which one of the two relays first named functions when it responds to deenergize locally both train circuits, and the other functions to deenergize locally only the train circuit associated therewith.

26. The combination of a pneumatic brake system, comprising a brake pipe extending through a train of vehicles, and reservoirs, brake cylinders and automatic brake valves connected therewith on the various vehicles; three normally deenergized electromotive devices associated with each such valve and each arranged to control a corresponding function thereof; two electrical circuits extending throughout the train; controlling means for maintaining said circuits normally energized and deenergizing one or both at will, and for establishing an abnormal voltage relation between the circuits while maintaining both energized; three means on each vehicle for storing electric energy, two of said means being connected to be charged individually from respective train circuits, and the third jointly from both train circuits; two relay devices, each responsive to deenergization of respective train circuits, and connected to discharge respective ones of the two energy storing means charged from individual circuits, through corresponding ones of said electromotive devices; a third relay device responsive to said abnormal voltage relation to discharge the third energy storing means through the third electromotive device; and means for protecting said relay devices against response to charging currents comprising asymmetric resistance devices for the individually charged energy storing means, and a split winding in the relay device associated with the third energy storing means, such winding being so connected that the two currents which jointly charge the third energy storing device neutralize each other and maintain the relay inert.

27. The combination of a pneumatic brake system comprising a brake pipe extending throughout a train of vehicles, and reservoirs, brake cylinders and automatic brake valves connected therewith on the various vehicles; electrically actuated quick service vent valves, associated with the brake pipe on the various vehicles; an electrical circuit extending throughout the train; means for maintaining said circuit normally energized; a service switch for deenergizing said circuit; electric energy storing means in the various vehicles, connected to be charged from said circuit; a relay device one on each of the various vehicles responsive to deenergization of said circuit and connected to discharge the energy storing device in the same vehicle through the electric actuation portion of the corresponding quick service vent valve on such vehicle; means for protecting each such relay device against response to charging currents and comprising an asymmetric resistance; and a cycling relay associated with said service switch, and functioning to neutralize the action of said service switch when the circuit is deenergized and restore its action when the circuit approaches full energization.

28. The combination defined in claim 27 in which the energy storing devices are electrostatic condensers.

29. The combination defined in claim 27, in which the energy storing devices are electrostatic condensers and the asymmetric resistance devices are copper copper-oxide rectifiers.

30. The combination defined in claim 27 in which the service switch grounds the electric circuit through a path established by the cycling relay when the latter is closed and such grounding serves to deenergize the winding of the relay.

31. The combination of a pneumatic brake system having brake applying valves on the various vehicles of a train; two electromotive devices associated with the brake applying valve on each car and adapted to control the same to produce service and emergency applications; two electric operating circuits and a supervisory circuit extending throughout the train; manually operable controlling means at the head of the train for maintaining said operating circuits normally energized, and for deenergizing one or both at will; two means for storing electric energy on each vehicle charged respectively from said operating circuits; two relay devices on each vehicle, each responsive to deenergization of a respective operating circuit and arranged to discharge respective ones of said energy storing devices through corresponding ones of said electromotive devices to actuate the same; means comprising asymmetric resistance devices serving to protect said relays against response to charging currents; means at the rear of the train to energize the supervisory circuit from said operating circuits while said circuits are operative; and means at the front of the train and responsive to at least partial deenergization of the supervisory circuit to deenergize at least one of said operating circuits.

32. The combination of a pneumatic brake system comprising a brake pipe adapted to extend throughout a train, and brake valves connected therewith on the various vehicles of the train; normally deenergized electromotive devices for controlling at least one function of said brake valves irrespective of control exercised through the brake pipe; a normally energized electric circuit extending through the train; electric energy storing devices on the various vehicles, connected to be charged from said circuit; and means responsive to conditions in said circuit for discharging said energy storing means through said electromotive devices.

33. The combination of a pneumatic brake system comprising a brake pipe adapted to extend throughout a train, and brake valves connected therewith on the various vehicles of the train; normally deenergized electromotive devices for controlling at least one function of said brake valves irrespective of control exercised through the brake pipe; a normally energized electric circuit extending through the train; electric energy storing devices on the various vehicles, connected to be charged from said circuit; and means responsive to deenergization of said circuit for discharging said energy storing means through said electromotive devices.

34. The combination of a pneumatic brake system comprising a brake pipe adapted to extend throughout a train, and brake valves connected therewith on the various vehicles of the train; normally deenergized electromotive devices for controlling at least one function of said brake valves irrespective of control exercised through the brake pipe; a normally energized electric circuit extending through the train; electric energy storing devices on the various vehicles; connected to be charged from said circuit; means responsive to conditions in said circuit for discharging said energy storing means through said electromotive devices; and means comprising an asymmetric resistance device for limiting the charging flow to said storage device without materially limiting the discharging flow.

35. The combination of a pneumatic brake system comprising a brake pipe adapted to extend throughout a train, and brake valves connected therewith on the various vehicles of the train; normally deenergized electromotive devices for controlling at least one function of said brake valves irrespective of control exercised through the brake pipe; a normally energized electric circuit extending through the train; electric energy storing devices on the various vehicles, connected to be charged from said circuit; and means comprising a relay responsive to deenergization of said circuit and an associated asymmetric resistance for insuring slow charging of said storage device when the circuit is energized and rapid discharge of the storage device under control of the relay through said electromotive device upon substantial deenergization of said circuit.

36. The combination of a pneumatic brake system comprising a brake pipe adapted to extend throughout a train, and brake valves connected therewith on the various vehicles of the train; three normally deenergized electromotive devices associated with each brake valve and each adapted to control a different function thereof irrespective of control exercised through the brake pipe; two normally energized electric circuits extending throughout the train; an electric energy storing device arranged to be charged from the first circuit and related to the first electromotive device; a second energy storing device arranged to be charged by the second circuit and related to the second electromotive device; a third energy storing device arranged to be charged from both circuits and related to the third electromotive device; means for deenergizing said circuits at will and for establishing a voltage difference between them while maintaining both energized; and means responsive to selective operation of the last-named means for discharging selected energy storing devices through their related electromotive devices.

37. The combination defined in claim 36, in which the means for discharging selected energy storing devices comprises relays.

38. The combination defined in claim 36, in which the means for discharging selected energy storing devices comprises relays and associated asymmetric resistance devices, said resistance devices serving to inhibit response of the relay to charging current while permitting relatively free discharge.

39. The combination defined in claim 36, in which the means for discharging selected energy storing devices comprises relays and associated asymmetric resistance devices, two of said resistance devices serving to limit the charging flow to the first and second energy storing devices to a rate insufficient to cause response of the related relays, and the third of said resistance devices serving to protect one of said circuits against back flow from the third energy storing device.

40. The combination defined in claim 36, in which the discharge of the third energy storing device is effected by establishing a voltage difference between the two lines while both are energized and the related electromotive device is maintained in an active condition by such voltage differential after response to discharge of the related storing device.

41. A braking system comprising an electric energy storage device having a discharge voltage in excess of its charging voltage; means for charging said device; an electrically operated brake incapable of responding to the charging current but responsive to discharge of current from said energy storage device; and means for causing discharge of said device to actuate said brake.

42. A braking system for vehicles, said system comprising an electrostatic condenser; means for trickle-charging said condenser; a brake; electrical operating means for said brake; and means for causing discharge of said condenser through said electrical operating means to operate said brake.

43. A braking system comprising a plurality of connected vehicles; electrically operated braking means on each of said vehicles; an electric energy storage device on each of said vehicles and connected with the braking means, said device having a discharge voltage in excess of its charging voltage; means for electrically charging said devices; and means for causing simultaneous discharge of the devices on each vehicle through their associated braking means to exercise a braking action on said vehicles.

44. A braking system comprising a plurality of connected vehicles; electrically operated braking means on each of said vehicles; an electrostatic condenser on each vehicle and connected to the braking means of the vehicle; means for charging said condensers; and means for causing simultaneous discharge of the condensers on all the vehicles to operate the braking means.

45. A braking system comprising a plurality of connected vehicles; electrically operated braking means on each of said vehicles; an electrostatic condenser on each vehicle; means for trickle-charging said condensers; and means for causing discharge of said condensers through said braking means to operate the same.

46. A braking system comprising an electric energy storage device constructed to receive its energy by slow charge and to discharge its stored energy substantially instantaneously; means for charging said device; electrically responsive braking means incapable of responding to the charging current but responsive to discharge of current from said energy storage device; and means for causing discharge of said device to actuate said braking means.

47. A braking system comprising an electric energy storage device having an oscillatory discharge; means for charging said device; electrically responsive braking means incapable of responding to the charging current supplied to said device but responsive to the discharge current from said device; and means for causing discharge of said device to actuate said brake.

GEORGE V. MORRIS.